US012769296B1

(12) United States Patent
Calori Badini et al.

(10) Patent No.: US 12,769,296 B1
(45) Date of Patent: Oct. 20, 2026

(54) SENSOR OUTPUT SYNCHRONIZATION WITH ALIGNMENT REFERENCE POINTS

(71) Applicant: Tractian Technologies Inc, Atlanta, GA (US)

(72) Inventors: Pedro Calori Badini, São Paulo (BR); Andrei Alves Cardoso, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/397,556

(22) Filed: Nov. 21, 2025

(51) Int. Cl.
*G05B 23/02* (2006.01)

(52) U.S. Cl.
CPC ..... *G05B 23/0221* (2013.01); *G05B 23/0281* (2013.01)

(58) Field of Classification Search
CPC ........................ G05B 23/0221; G05B 23/0281
See application file for complete search history.

(56) References Cited

U.S. PATENT DOCUMENTS 6,618,648 B1 * 9/2003 Shirota ................ G01R 31/088 700/286
7,301,296 B1 * 11/2007 Discenzo ........... G05B 19/4063 318/434
11,380,363 B1 * 7/2022 Hay ........................ G06T 11/26

* cited by examiner

*Primary Examiner* — Ricky Go
(74) *Attorney, Agent, or Firm* — Cognition IP, P.C.; Edward Steakley; Saleh Kaihani

(57) ABSTRACT

A maintenance and monitoring infrastructure can use a plurality of sensors or monitors in an industrial plant to obtain machine samples from a large collection of assets (industrial machines). Multiple wireless monitors can be affixed to an industrial machine and its subcomponents. Each monitor can collect samples from the industrial machine. For some applications, including failure source and type analysis, time-synchronized samples from a collection of monitors can be helpful. Monitors can receive synchronization instructions to embed their output sample waveforms with alignment reference points, which can be used, by a backend synchronization server, to synchronize or align the output waveforms from the different monitors.

20 Claims, 9 Drawing Sheets

SENSOR OUTPUT SYNCHRONIZATION WITH ALIGNMENT REFERENCE POINTS

BACKGROUND

Field

This invention relates generally to the field of wireless communication and more particularly to synchronization of techniques in wireless communication.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines are monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

An automatic maintenance infrastructure can take advantage of monitors and receivers that are equipped with wireless communication technology. Thousands of wireless sensors or monitors can be deployed throughout an industrial plant. For some applications, including those related to maintenance, synchronizing a collection of sensors, so they can start collecting machine data at the same time can offer insights into machine maintenance and diagnosis, as well as other usages. The monitors can include internal time keeping and clock components, which can be recruited to synchronize the sensors and trigger them at the same time, so their output waveforms are time-synchronized. Traditional clock synchronization techniques, however, still suffer from an amount of clock drift, causing even the synchronized sensors to be out of sync by some drift or error amount. The error can typically render some useful failure analysis technique imprecise or impractical. Therefore, there is a need for more robust synchronization techniques that can counter the clock drift error, introduced by traditional clock synchronization techniques.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
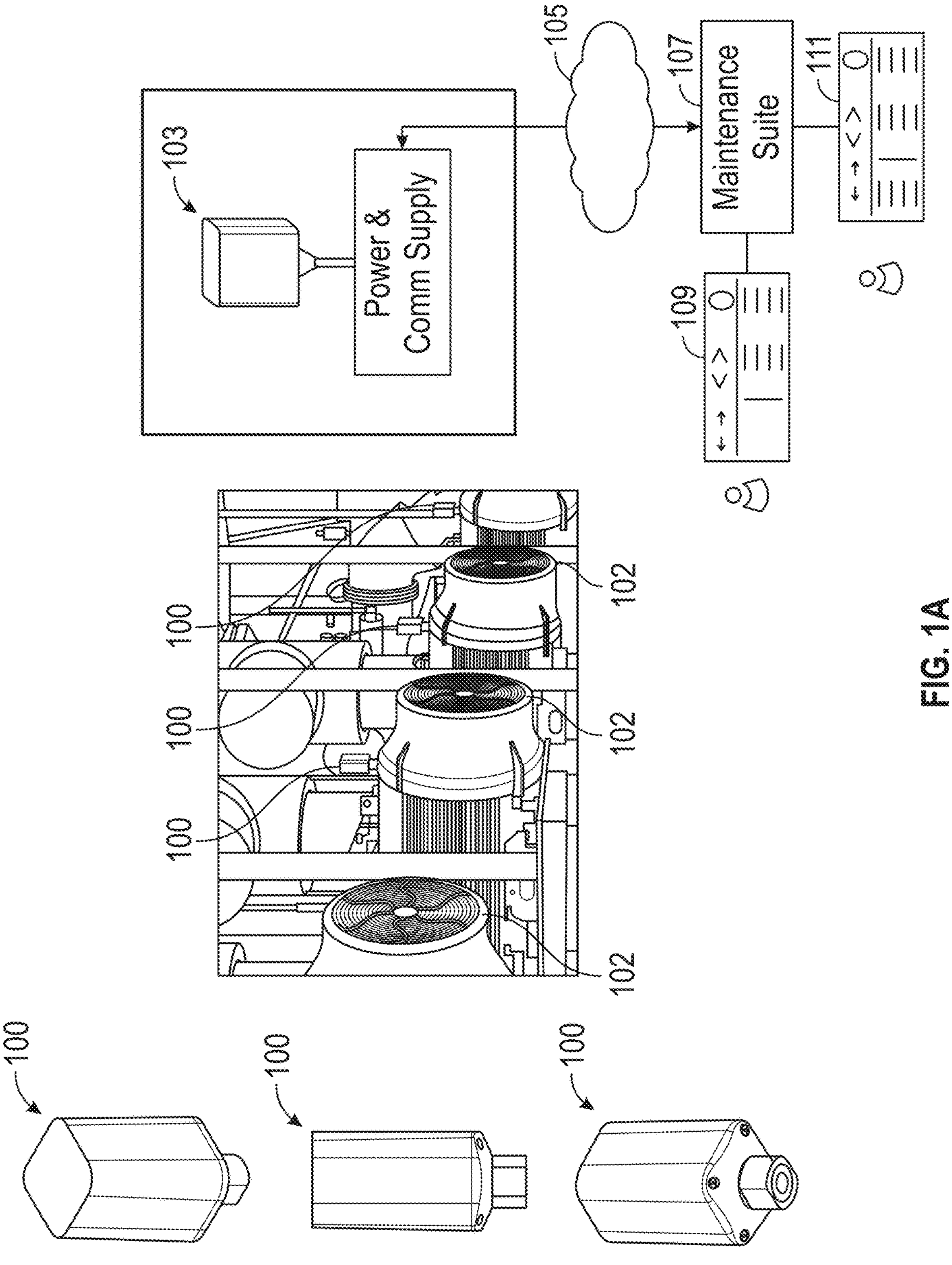
FIG. 1A illustrates example diagrams of a monitor, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms “one”, “a” or “an” are used in the disclosure, they mean “at least one” or “one or more”, unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Industrial machines can benefit from consistent and accurate fault monitoring with artificial intelligence processing of the monitored data. In some embodiments, a plurality of small monitor assemblies, each equipped with wireless communication circuitry can be attached to various industrial machines in a plant. The monitors can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine.

FIG. 1A illustrates example diagrams of a monitor 100, industrial machines 102, and an infrastructure of fault monitoring and maintenance operations according to some embodiments. The monitor 100 can be battery operated and can include a variety of sensing components enclosed in a housing. The monitor 100 can attach to machines 102 in the plant using a magnetic connection and/or by using other methods of attachment and fastening to secure the monitors 100 to machines 102 in the plant. The attachment of the monitors 100 to machines 102 can depend on the magnitude of the vibrations and other considerations related to the environment of the machines 102 and the plant. For example, if larger magnitude vibrations are expected, the connection between the monitors 100 and the machines 102 can be secured with an adhesive agent, so the monitors 100 can maintain their connections to the machines 102, despite large vibrations.

The monitors 100 can include wireless communication circuitry and can be in wireless communication with one or more receivers 103. In some embodiments, one or more monitors 100 can be modified to be in wired communication with a receiver 103 and have a connection to an outlet source of power. In other words, the source of power and type of communication of the monitors 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the monitors 100 and the receivers 103 can wirelessly communicate to a portable computer, such as a laptop, a smart phone, a smart tablet, or other portable devices, in the field, using a local or cellular wireless network. Although the term receiver is used, the receivers can also send data to monitors 100. Consequently, receivers 103 can be transceiver devices. For example, a receiver 103 can send a configuration file to a monitor 100 to enable, disable or otherwise configure various operating parameters of the monitor 100.

The numbers and locations of the receivers 103 can depend on the size of the plant and then numbers and distances of the monitors 100, relative to the receiver 103 and the wireless communication technology used to communicate between the monitors 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 105, and other communication midpoints, or endpoints. The receivers 103 can transmit the fault monitoring data for upstream processing. The receivers 103 can also receive various operational configuration files, settings files, and/or other operating parameters and can transmit the operating parameters to the monitors 100. Examples operating parameters can include various timing and frequency of when and how the monitors 100 should collect data from the machines 102.

A maintenance suit 107 can receive monitoring data from the monitors 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the monitors 100 can be viewed and/or modified via the user interfaces 109, 111. The user interfaces 109, 111 can provide access for a user to generate or modify configuration files, settings and operating parameters for the monitors 100 and the maintenance suite 107. The users can also view the output of the maintenance suite 107 via the user interfaces 109, 111.

While not shown, the monitors 100 are not the only maintenance-related in-field components operated by the maintenance suite 107. Other components associated with monitoring and maintenance of the machines 102 and the plant can also be in communication with the maintenance suite 107. For example, in some embodiments, energy management components in communication with the maintenance suite 107, can monitor the power consumption of the machines 102 and their plant.

Depending on the size of an industrial plant, the monitors 100 can be numerous, for example in the hundreds or thousands. The maintenance suite 107 can streamline and track data from hundreds or thousands of machines and automate the identification and tracking of maintenance-related tasks for a large industrial plant, having hundreds or thousands of machines.

Figure 1B:
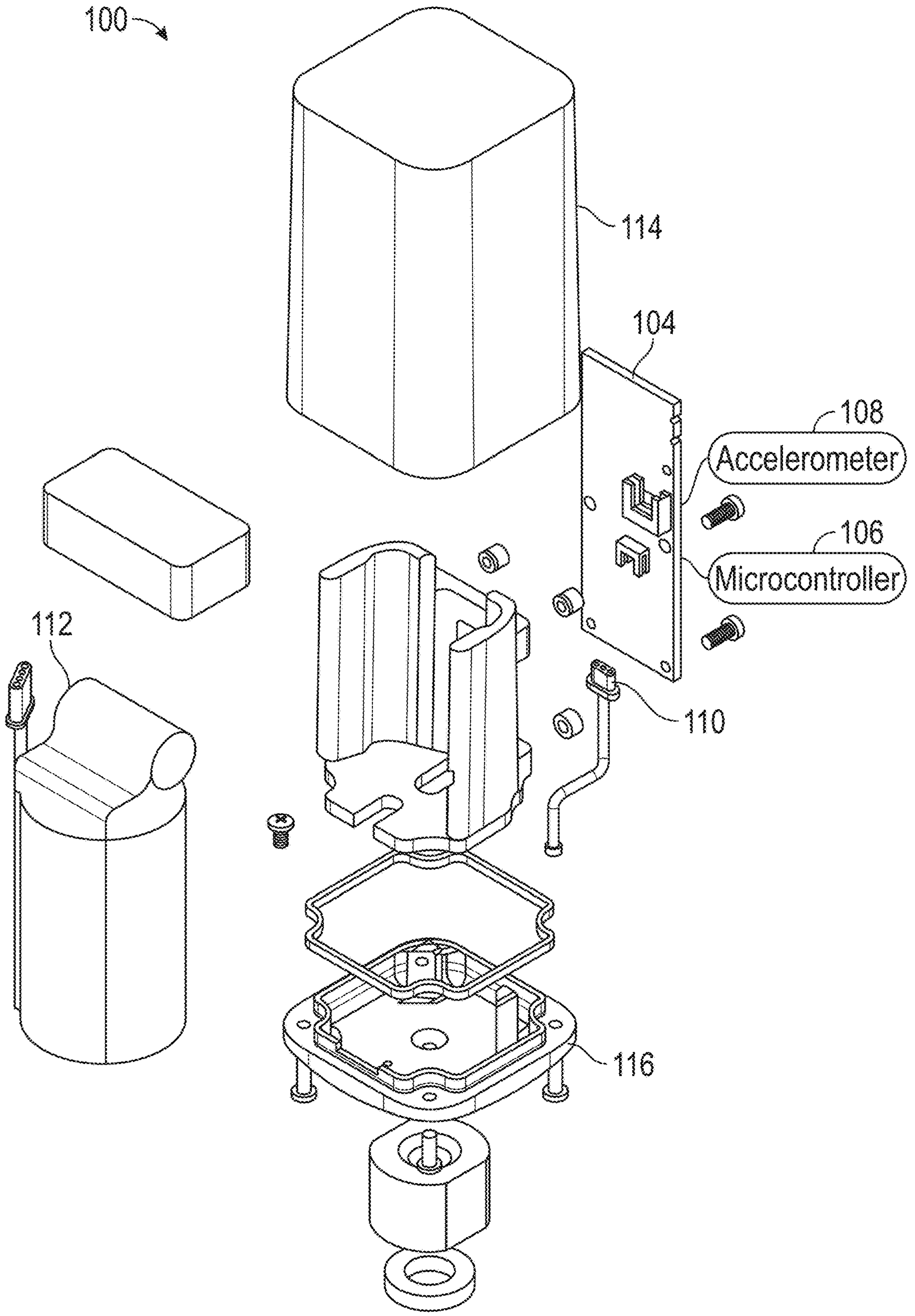
FIG. 1B illustrates an exploded view of the monitor of the embodiment of FIG. 1A.

FIG. 1B illustrates an exploded view of a monitor 100. Some example components include the printed circuit board (PCB) 104, the microcontroller 106, an accelerometer 108, a temperature sensor 110, a battery module 112, various spacers, holders, internal conduits, and a housing 114. The housing 114 can house the internal components of the monitor 100. A housing lid 116 can enclose the housing 114 and seal the internal components of the monitor 100 from the outside. The monitor 100 can be made water-, dust- and particle-resistant by a variety of techniques. For example, in some implementations, the monitor 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years.

The monitor 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the monitor 100 from a receiver 103. The communication circuitry of the monitor 100 can be mounted on the PCB 104. In some embodiments, the communication circuitry may be integrated in the microcontroller 106. Similarly, in other embodiments, various components can be combined into one or use a component that integrates several components together. The monitor 100 can include a magnetic collar to provide magnetic attachment between the monitor 100 and the machine 102. In some embodiments, the temperature sensor 110 can be routed to a surface very near the point of contact between the monitor 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The microcontroller 106 can receive the acceleration data, from the accelerometer 108 and can generate spectral data of the vibrations of a machine 102.

The microcontroller 106 can be a collection of various components, including computer or computing components. Example components of the microcontroller 106 can include a processor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the monitor 100 can include dedicated wireless communication circuitry, fabricated or included in the monitor 100, in a separate component than the microcontroller 106.

The monitors 100 can be configured to spend the majority of their time in hibernation state to conserve battery power. In hibernation mode, the power to all or some of the components of the monitor 100 can be reduced or minimized, thereby reducing the overall battery consumption in the hibernation state. The monitors 100 can be configured to periodically exit hibernation mode and enter normal operation mode, where power and functionality to some or all components is restored. For example, the monitors 100 can perform periodic sampling of various operational parameters of the machines 102, such as temperature and vibrations. When scheduled sampling is not performed, the monitors 100 can be in hibernation mode.

The monitors 100 can perform a variety of samplings of machine operation parameters. For example, for the vibration parameter of the machines 102, the monitors 100 can perform various samplings at different intervals and with different characteristics. Example sampling characteristics can include sampling intervals, sampling frequency, sampling rate, sampling range, sampling resolution and other characteristics. Sampling interval can refer to the period by which the monitor 100 turns ON and performs a sampling with a selected set of sampling characteristics. In some embodiments, the monitors 100 can be configured to perform scheduled sampling sessions, which are samplings performed at selected intervals. The selected intervals can depend on the type of machines 102 and other factors that are application-dependent, based on where the monitors 100 are used. Example sampling intervals can include sampling with intervals separated by minutes, hour or hours, days, or even months, and other intervals.

The monitor 100 is a battery-operated device. In most applications extending the longevity of the monitor 100 is proportional to the longevity of the battery module 112. A significant portion of the battery consumption of the monitor 100 relates to the transmission of data to the receiver 103. At the same time, typical industrial environment of the monitor 100 and the receiver 103 can present challenges for wireless transmission of data between the two devices. For example, industrial environments can introduce substantial noise and interference to wireless transmission of data between the two devices. Various wireless communication frameworks exist and can be utilized for transfer of data. A wireless communication framework can provide a basic level of functionality between transmission nodes. Referencing the open systems interconnection (OSI) model, various existing wireless communication frameworks can provide some of the functionality for wireless transmission of data between a monitor and a receiver. For example, an existing wireless communication framework can provide a physical layer for wireless transmission of data between the monitor and the receiver, using radio waves.

The monitor 100 is but one example device, which can be used in a maintenance and monitoring infrastructure. Other devices may also be used. For example, some industrial machines 102 can include an integrated sensor, which reports on the operational parameters of the machine. For the purpose of the described embodiments, any monitoring device with wireless communication capability can be used. While the embodiments are described in relation to the monitor 100, any monitoring device with wireless communication capability can be used. Additionally, for the purposes of the described embodiments, monitors 100 can alternatively be referred to as sensors.

Industrial machines, or assets (as maintenance professionals may call them), can include discrete components that together make up the functionality of the machine. For example, one asset can include a motor, a reductor and a pump. Often monitors 100 are placed in multiple sub-components of an asset to monitor one or more operating characteristics. Each monitor 100 can independently collect machine operation data, corresponding to the component to which the monitor 100 is affixed. When an asset includes multiple sub-components, a collection of monitors 100 can form a group, allocated to collecting machine samples for an asset, where each subcomponent has at least one monitor collecting samples from it. However, other group configurations can also be defined by maintenance personnel, where not every sub-component is monitored.

In terms of failure analysis, comparing the sample waveforms from the sub-component sensors can yield insights into maintenance issues, and particularly the source of a maintenance issue. Failure analysis, via multiple sensor sample waveform comparison, can yield much better results when the sensors are synchronized. Synchronization in this context can refer to each sensor beginning to collect samples and generating a sample waveform at the same time as other sensors in its group, or by an alignment method, where the collected sample waveforms are later shifted to align them. Alignment in this context can refer to shifting a sample waveform to match the collection timing of another sensor. Alignment can allow waveform comparison as if the sample waveforms were collected beginning at the same time.

Figure 2:
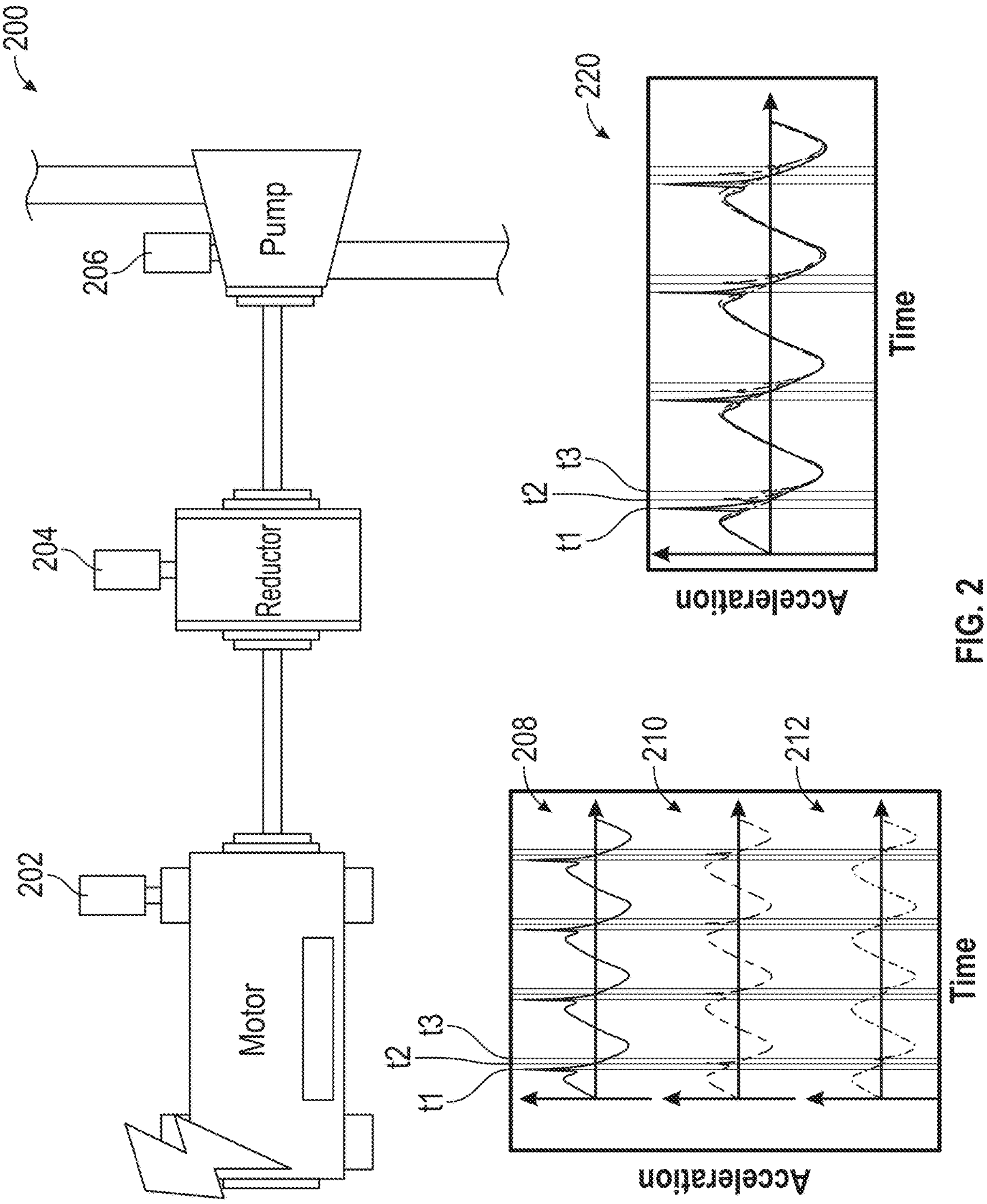
FIG. 2 illustrates a diagram of an asset, where discrete subcomponents are monitored and sensor synchronization is used for failure analysis.

FIG. 2 illustrates a diagram of an asset 200, where discrete subcomponents are monitored and sensor synchronization is used for failure analysis, along with sample waveforms generated from the sensors. The graphs illustrate acceleration versus time sample waveforms. In this example, each subcomponent is monitored by a sensor. A motor is monitored by sensor 202, a reductor is monitored by sensor 204, a pump is monitored by sensor 206. Each sensor collects a sample waveform (e.g., machine vibrations can be collected using the accelerometer of the monitor 100). Sensor 202 collects the sample waveform 208, sensor 204 collects the sample waveform 210, and sensor 206 collects the sample waveform 212. In this scenario, the sensors 202, 204, 206 are configured to start collecting samples at the same time. In other words, the sensors are synced. In this scenario, a failure in an upstream component (e.g., the motor) can propagate to downstream components and show up in the sample waveforms of the downstream components as peaks. In the example shown, the motor 202 can be the source of a failure, thus its sample waveform 208 can show a peak t1 (repeating periodically in the sample waveform 208). The failure propagates to downstream components, appearing as peaks t2, t3, in the sample waveforms 210, 212, respectively. The peaks t1, t2, t3 repeat periodically.

The further a downstream component is, from the source of failure, the lesser is the magnitude of the peak, corresponding to the failure. In the example shown, the magnitude of peak t3 is less than the magnitude of peak t2, and the magnitude of peak t2 is less than the magnitude of peak t1. The peaks in the sample waveforms of the downstream components also appear with a delay, relative to the peaks in the sample waveforms of the upstream components, due to the time delay introduced by the waveforms having to travel in the medium of propagation (e.g., the peak t1 can travel with a speed of sound, causing a delay between when the peaks t1, t2, t3 appear in the sample waveforms 208, 210, 212, relative to one another). Since the sensors are synced and have started collecting their respective sample waveforms at the same time, the timing correlation between the peaks at t1, t2, t3 can provide insight into where the first failure point occurred (e.g., indicating the motor 202 might be a candidate). Graph 220 superimposes the sample waveforms 208, 210, 212 for better visualization of the technique of synchronizing the sensors and garnering failure analysis insight. Besides the timing correlation between detected peaks in the sample waveforms, other factors also may have to be considered for a more robust failure analysis (e.g., phase offset, peak offset, magnitude, damping, etc).

The maintenance personnel can focus their troubleshooting on a candidate failure source (e.g., the motor 202 (Failure characteristics can travel at the speed of sound and show up in the sample waveform (e.g., vibration waveform) of another subcomponent. When the sensors are synced, the timing correlation between their respective sample waveforms can be explored to gain insights into maintenance issues, including for example, the source or initial appearance of a maintenance problem. Time comparison is an example of analysis that can be performed with time-correlated or aligned sample waveforms, phase analysis or other waveform comparison analysis techniques can also be performed to gain insight from the sample waveforms. However, the techniques relying on sensor synchronization can face practical implementation challenges, and be difficult to implement, or may yield unreliable results, due to difficulty in implementation.

While the embodiments will be described in relation to vibration sample waveforms, other sampled machine data can also benefit from the synchronization systems and methods described herein. For example, energy sample waveforms and/or power sample waveforms are additional examples of sample waveforms that can be the subject of the described embodiments. Furthermore, failure analysis is not the only function of the described sensor synchronization systems and techniques. For example, time-correlated, or aligned sample waveforms, can provide insights into movement and operations of machine systems, having a complex subcomponent structure.

Several technical challenges stand in the way of sensor synchronization, at least in the context of battery-powered monitors 100, deployed in a maintenance and monitoring infrastructure. For example, time synchronization can include power-intensive clock operations. The monitors 100 can spend most of their time in a low-power state and only wake up (according to a selected schedule) to collect samples. Power-intensive precise time keeping operations can drain the battery module 112 more than is practical for a life span of a monitor 100. Furthermore, various time synchronization techniques still cannot synchronize the sensors to a level of precision that failure analysis, via waveform comparison or similar techniques, may demand. In other words, the clock drifts of the sensors, relative to one another, can make the collected sample waveforms less reliable for waveform comparison analysis. In many cases, without time-correlation data, the level of precision of waveform matching may not satisfy the requirements of the sample waveform comparison techniques. As an example, some synchronization techniques bring the sensors in synchronization with errors (drift) in the order of milliseconds, while sample waveform comparison techniques may require the sample waveforms to be aligned in the order of microseconds, or several orders of magnitude more precise than clock synchronization techniques can yield.

Figure 3:
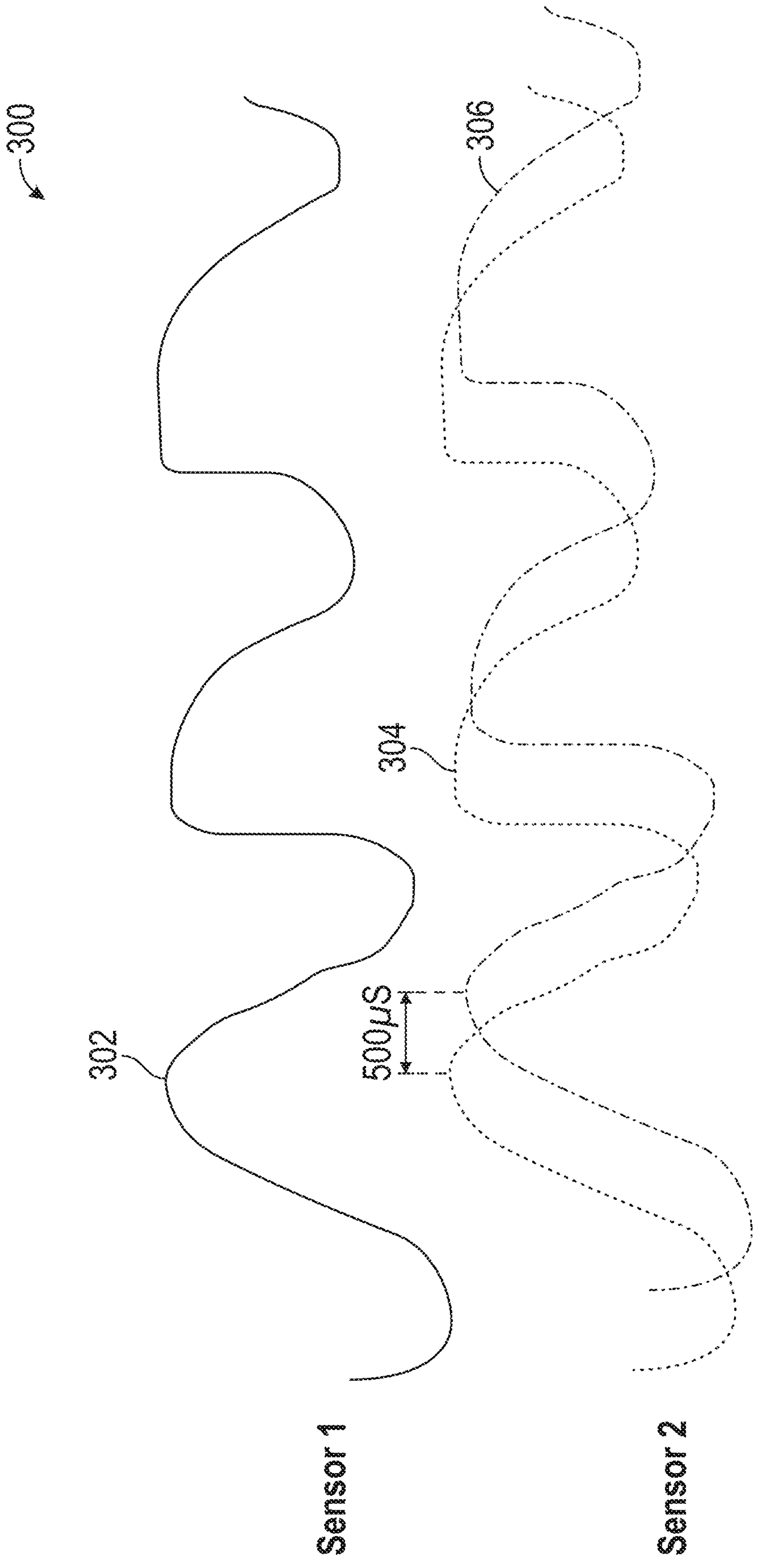
FIG. 3 illustrates a graph that may be used in sample waveform comparison techniques for failure analysis.

FIG. 3 illustrates a graph 300 that may be used in sample waveform comparison techniques for failure analysis. Sensor 1 collects the sample waveform 302, and sensor 2 can potentially collect the sample waveforms 304 or 306. Sensors 1 and 2 can be in a group together monitoring an asset. As an example, sensor 1 can be in a shaft and sensor 2 can be in a motor. If sensor 2 is outputting the sample waveform 304, relative to sensor 1 sample waveform 302, the components can be exhibiting a failure of a first type, for example an "unbalanced" type of failure. If sensor 2 is outputting the sample waveform 306, relative to the sensor 1 sample waveform 302, the components can be exhibiting a failure of a second type, for example a "misalignment" of the components. Knowing the phase between the two sensors' fundamental frequency can help to differentiate some faulty conditions that otherwise would be difficult, if not impossible, to differentiate looking only at the magnitude of the vibration, such as angular and offset misalignment. Because of this dynamic, knowing whether sensor 2 is outputting waveform 304 or waveform 306 can make the difference between correct or wrong failure analysis. The potential sample waveforms 304, 306 are only offset from one another by 500 microseconds in this example. Consequently, a clock synchronization technique, having a relative drift in the order of milliseconds, can render waveform comparison analysis of this sort imprecise or impractical.

Figure 4:
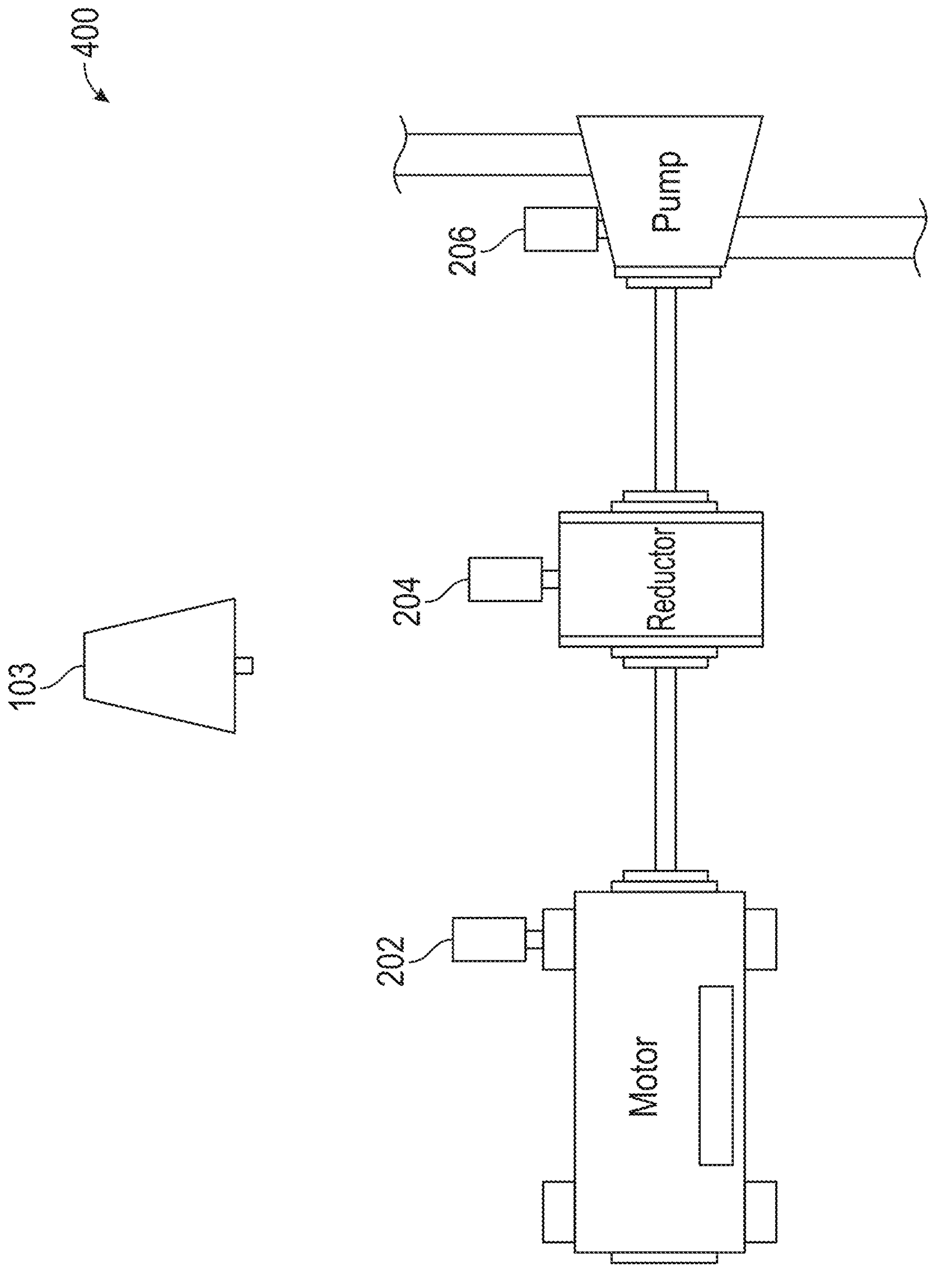
FIG. 4 illustrates a diagram of an example synchronization technique, using a shared receiver.

FIG. 4 illustrates a diagram 400 of an example synchronization technique, using a shared receiver 103. The receiver 103 can be used as an intermediary to accomplish sensor synchronization. The receiver 103 can send synchronization beacons to sensors 202, 204, 206. The sensors can also send synchronization beacons to one another. The clocks in sensors 202, 204, 206 can be synced, using traditional synchronization techniques. The traditional synchronization techniques can sync the sensors with an error in the order of milliseconds yielding a range of predicted or expected clock drift. In one embodiment, the sensors can be scheduled to wake up at a time before the maximum drift, associated with the synchronization technique, and await a synchronization beacon from the receiver 103. Once the sensors receive the synchronization beacon from the receiver, the sensors can begin their sampling together, thereby collecting samples, whose output waveforms will be aligned in time because the sensors began sampling at the same time when they received the synchronization beacon (plus or minus any delay in the reception of the synchronization beacon). There can still be challenges with the receiver-mediated synchronization technique. The sensors may have to idle for a non-trivial amount of time before they receive the synchronization beacon from the receiver, thus, wasting precious battery energy. There is also no guarantee that every sensor can hear the synchronization beacon.

Sensor-level clock synchronization, or sampling start time synchronization, can present technical challenges, including having to run the sensors in idle time, wasting battery. An alternative synchronization method can stamp the output sample waveforms with alignment reference points. The alignment reference points can be used to shift or align the output sample waveforms, despite each output sample waveform having a different sampling collection start time.

Figure 5:
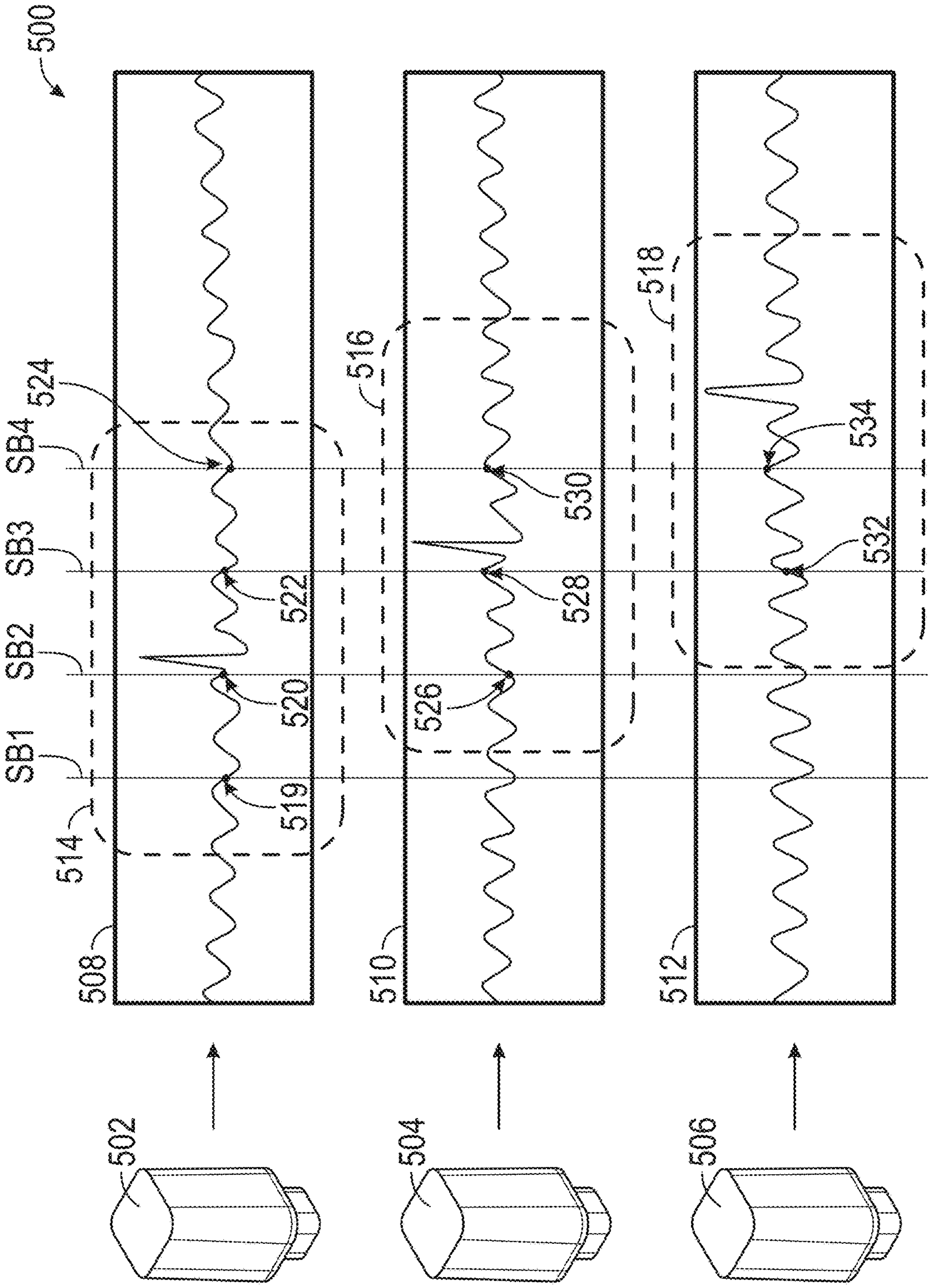
FIG. 5 illustrates graphs of sample output waveforms, where alignment reference points are embedded in the output sample waveforms for subsequent alignment of the output waveforms.

FIG. 5 illustrates graphs 500 of sample output waveforms, where alignment reference points are embedded in the output sample waveforms for subsequent alignment of the output waveforms. Graphs 500 relate to three sensors 502, 504, 506. The sensors can be part of a group of sensors dedicated to monitoring an asset and its subcomponents. Graph 508 relates to the first sensor 502. Graph 510 relates to the second sensor 504. Graph 512 relates to the third sensor 506. As an example, graphs 500 can be vibration sample waveforms. Sensor 502 collects its samples during window 514. Sensor 504 collects its samples during window 516. Sensor 506 collects its samples during window 518. While the sensors can be initially synced, using a conventional clock synchronization technique, due to clock drift, each sensor may start its collection at different times. In the example shown, sensor 502 has started its sampling first, then the sensor 504, and lastly sensor 506. As a result, the sample collection windows 514, 516 and 518 are offset by some amount.

Each sensor can be configured with a set of synchronization rules, communicated to it via firmware instructions, from servers in the maintenance suite 107. When sensors implement the synchronization rules, they generate output waveforms that include embedded alignment reference points. When there is an overlap in the sample collection windows and in the overlap windows there are alignment reference points, the entire output sample waveforms from the respective sensors can be aligned, using the alignment reference points. In other words, when the set of synchronization rules is implemented, a window of synchronized samples can be determined, from which the entire output waveforms can be aligned.

Synchronization rules include instructions for a sensor to begin sending a synchronization beacon (SB), a selected period of time after starting to collect samples, but only if the sensor does not receive any synchronization beacon from another sensor. Sensors wake up at different times, due to clock drift. It can be indetermined which sensor is going to be the first sensor to wake up and start collecting samples. In the example shown, the sensor 502 is the first to wake up, and since no other sensors are awake, sensor 502 does not hear any synchronization beacon. Sensor 502 assumes the role of beacon sender and starts transmitting SBs after a period of time. Synchronization rules can include instructions for the beacon sender to periodically repeat transmitting of the SBs for the duration of the sample collection or other selected time frame. In the example shown, sensor 502 has sent four synchronization beacons, SB1-SB4 during its sample collection window 514. Sample collection windows 514, 516, 518 overlap. SB1-3 are received by the second sensor 504, and SB3 and SB4 are received by the third sensor 506.

Another synchronization rule includes instructions for a sensor to not transmit any SBs if it can hear another SB, from another sensor in its group. In other words, when sensors 504, 506 are not the first sensor to wake up, and they are receiving SBs from sensor 502, they don't transmit any SBs of their own, at least in regard to the group in which they are with sensor 502. The sensors can be in other groups with other sensors, in which case, they implement the synchronization rules with respect to each group independently.

The synchronization beacon sent by the beacon sender can include a sensor identifier of the beacon sender, or sensor 502 in this example, a broadcast identifier, or an SB identifier, identifying the synchronization beacon, SB1, SB2, SB3, SB4, in this example, and a sample identifier. The sample identifier corresponds to the sample in the output sample waveform that was collected or being collected when the beacon sender sent the synchronization beacon. The receiving sensor also annotates a sample in its output sample waveform when the synchronization beacon was received. In this manner, a pair of alignment reference points in the output sample waveforms of the sensors is recorded or annotated. In the example shown, the beacon sender 502, when sending the SBs, annotates them or embeds in the SBs, a sensor identifier, an SB identifier and a sample identifier.

The sensor identifier identifies that the SB came from sensor 502. The SB identifier identifies the synchronization beacon. In some implementations, the SB identifier can be a sequential number identifying a synchronization beacon. Various sample identifier protocols can be used. In some implementation, the monitors can sequentially number the samples they collect, along with the sample collection window identifier. These additional identifiers can also be included in the sample identifier used in the synchronization beacon. The sample identifier identifies the sample when the SB was sent. In this example SB1 was sent when sample 519 was collected, but SB1 was not received by any other sensors, as they had not woken up yet. SB2 was sent when sample 520 was collected. Sensor 504 received SB2 when it was collecting, or when it had just collected sample 526. Sensor 504 annotates its output waveform (the collection window 516) with information that identifies a alignment reference point. The information or annotation can include at sample 526, a synchronization beacon, having sensor identifier 502, SB identifier SB2, and sample identifier 520 were received. In this manner, samples 520, 526 can act as alignment reference points, where the output sample waveforms, or sample collection windows 514, 516 can be aligned by shifting them to overlap the alignment reference points such as samples 520, 526.

Additional alignment reference points can be generated as more sensors wake up and their sample collection windows start overlapping with a beacon sending sensor. In the example shown, sensor 506 does not receive SB2, but receives SB3. SB3 yields alignment reference points (or samples) 522, 528 and 532 in the output sample waveforms of sensor 502, 504, and 506, respectively. Similarly, SB4 yields alignment reference points (or samples) 524, 530, and 534 in the output sample wave forms of sensors 502,504, 506, respectively. The described technique also has the advantage that even if some SBs are lost, not received, or corrupted, the output sample waveforms can still be aligned, using the SBs and corresponding alignment reference points that were successful.

The set of synchronization rules can include instructions for when sensors can assume the role of beacon sender and begin sending SBs. The sensors can listen for a selected wait-and-listen interval of time, and if no beacon is received during this interval, the sensor can assume the role of a beacon sender and begin sending SBs. In the example shown, when sensor 502 stops collecting samples and sending SBs, one of the other sensors 504 or 506 can begin sending SBs, when it does not hear another SB. Since the sensors are not exactly time-synced, they each start their wait-and-listen interval at different times, one assuming the beacon sender role first.

The alignment reference points allow one sensor to act as an intermediary between two sensors whose sample collection windows do not overlap with one another, but they overlap with the sample collection window of the intermediary sensor. In other words, the alignment reference points of the intermediary can be used to match the output sample waveforms of the non-overlapping output sample waveforms. Furthermore, the described techniques can be used with an unlimited number of sensors and with any sensor hardware that has wireless communication capabilities.

Figure 6:
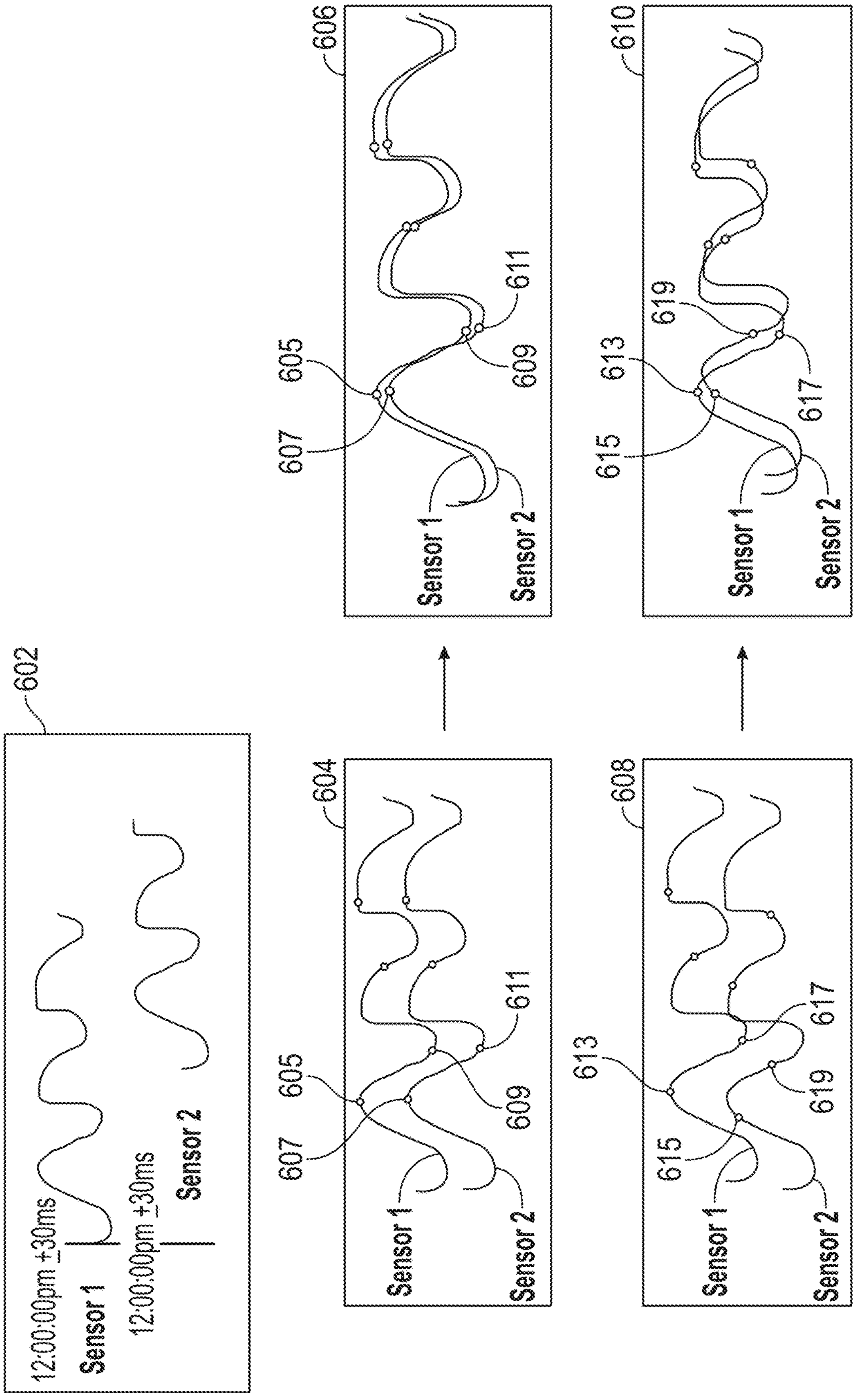
FIG. 6 illustrates graphs of using various alignment techniques, including using alignment reference points, as described above.

FIG. 6 illustrates graphs of using various alignment techniques, including using alignment reference points, as described above. In graph 602, first and second sensors are synchronized, using traditional clock synchronization techniques, to start collecting samples at 12 pm. Clock drifts can cause them to be offset in their time keeping by plus or minus 30 milliseconds. As a result, their output sample waveforms are offset by some amount. The drift or offset amount can render some waveforms analysis techniques, including failure analysis using waveform comparison imprecise or impractical. In graph 604, the first and second sensors are synced, using conventional clock syncing techniques, but their output waveforms are also annotated with alignment reference points, using the technique described above. For example, two pairs of alignment reference points are indicated by reference numerals, (605, 607) and (609, 611). A backend server, for example, a server in the maintenance suite 107, can align the two waveforms, as shown in graph 606, using the pairs of alignment reference points. When aligned, various failure analysis techniques can be performed to gain insight into any failure characteristics, exhibiting in the aligned output waveform.

In graph 608, the first and second sensors are similarly synced, using conventional clock syncing techniques, but their output waveforms are also annotated with alignment reference points, using the technique described above. For example, two pairs of alignment reference points are indicated by reference numerals, (613, 615) and (617, 619). A backend server, for example, a server in the maintenance suite 107, can align the two waveforms, as shown in graph 610, using the pairs of alignment reference points. When aligned, various failure analysis techniques can be performed to gain insight into any failure characteristics, exhibiting in the aligned output waveform. For the purposes of illustration, the graphs 606, 610 do not show completely aligned waveforms to help visually distinguish the two waveforms and their respective reference alignment points. In practice, the graphs can be completely aligned where the alignment reference points and the graphs overlap and superimpose completely.

In some embodiments, an artificial intelligence (AI) network, or machine learning (ML) model can be trained to identify failure types from the aligned output waveforms. For example, the ML model can be given instructions to digest a set of example aligned graphs with associated failure type labels. The trained ML model can receive an aligned graph and output a failure type label for the aligned graph. For example, the aligned graph resulting from graph 606 can be labeled as an unbalance failure type. Similarly, the aligned graph resulting from graph 610 can be labeled as a misalignment failure type.

Similarly, the ML model can be trained with instructions, having examples of aligned output waveforms from a plurality of monitors and a corresponding source of a maintenance issue. The example waveforms can be from monitors deployed in a single machine, but at different subcomponents of the machine. In this manner, the ML model can be trained to identify the source of a maintenance issue (for example, a subcomponent experiencing failure). The inference operations include providing the trained ML model with aligned output sample waveforms, where the trained ML Model labels the input sample waveforms with a matching failure type and/or failure source.

Figure 7:
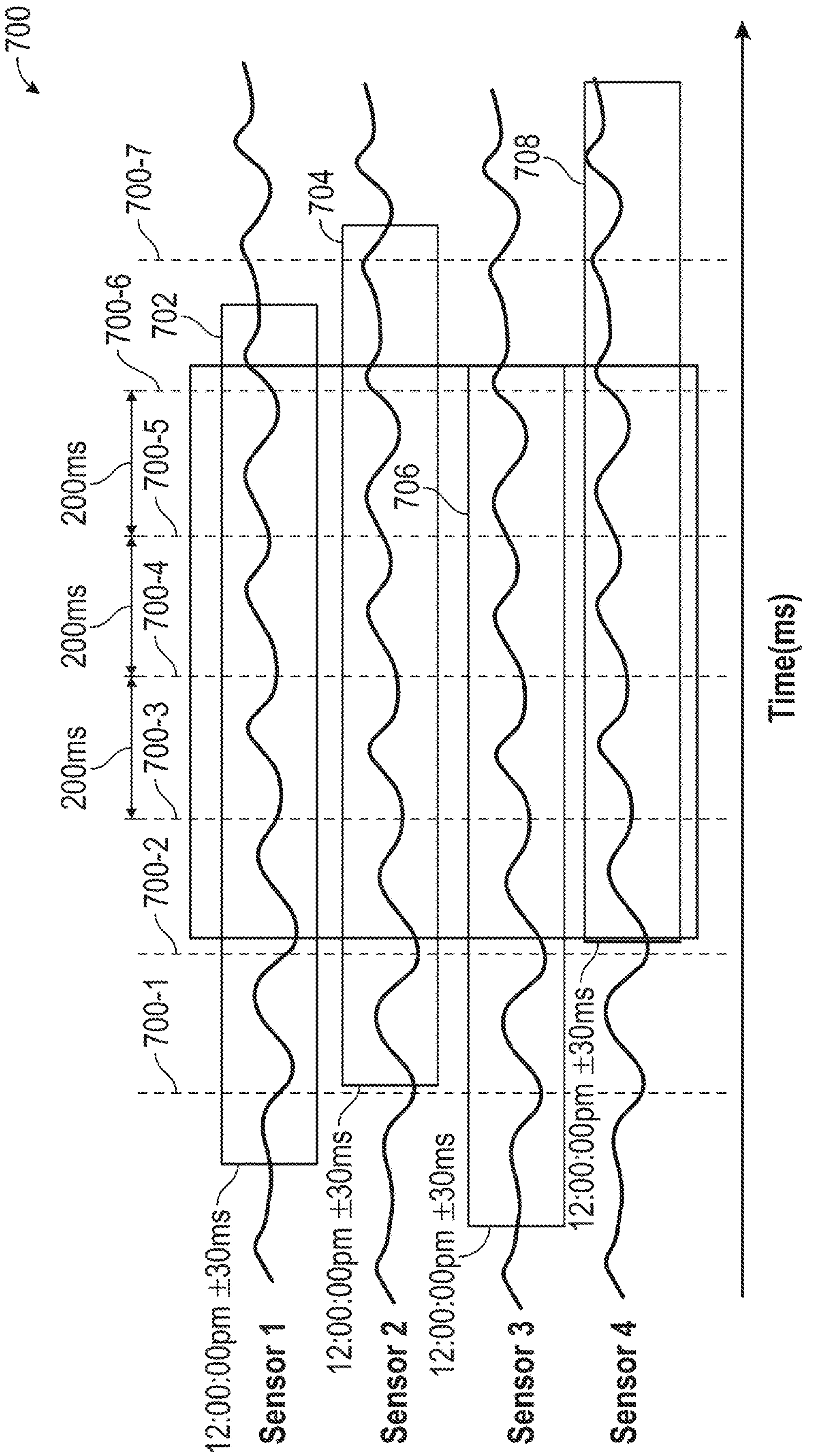
FIG. 7 illustrates graphs of sample waveforms, observable by four sensors, their respective sample collection windows, and synchronization beacons.

FIG. 7 illustrates graphs 700 of sample waveforms, observable by four sensors, their respective sample collection windows, and synchronization beacons 700-1 through 700-7. In some embodiments, the number or the frequency of the synchronization beacons is selected, based on the duration of a sampling session (the length of a sampling collection window), and considerations of preserving the availability of the wireless communication channels that the sensors use. In one implementation, for a sampling session of about 2-3 seconds, spacing the synchronization beacons 200-300 milliseconds apart, allows for synchronizing a large number of sensors. Sample collection windows 702, 704, 706, and 708, correspond to samples from the first, the second, the third, and the fourth sensor, respectively. The sensors are synchronized using conventional clock synchronization methods. Sensors can also be synced using the receiver-mediated method, described above. In this example, the sensors are synced to start their sampling window at 12 μm. Expected clock drift is plus or minus 30 milliseconds. Due to clock drift, the sensors start their sample collection window at different times, relative to one another. Nevertheless, the annotations derived from the synchronization beacons 700-1 through 700-7 can be used to align the output waveforms, as described above.

Example Implementation Mechanisms

Some embodiments are implemented by a computer system or a network of computer systems. A computer system may include a processor, a memory, and a non-transitory computer-readable medium. The memory and non-transitory medium may store instructions 406 for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 8:
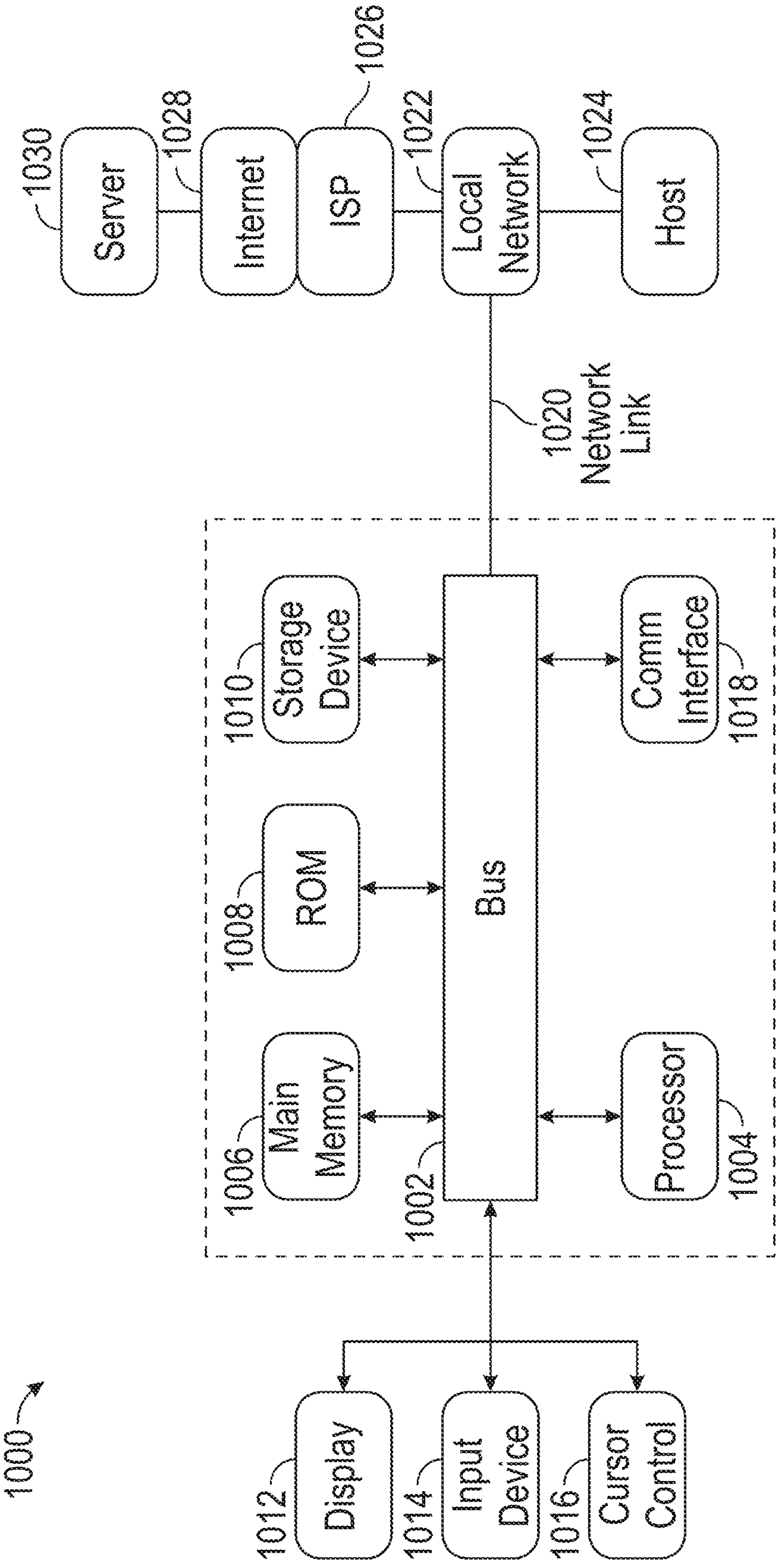
FIG. 8 is an environment in which some embodiments can be implemented.

For example, FIG. 8 is a block diagram that illustrates a computer system 1000 upon which an embodiment, or a portion thereof, can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In some embodiments, one or more AI models can be implemented in one or more application integrated circuits for an artificial intelligence such as an artificial neural network (ANN). Such integrated circuits can represent a plurality of neurons organized in an array, where each neuron includes a register, a microprocessor, and each neuron receives at least one input. The integrated circuits can further represent a plurality of synaptic circuits, each synaptic circuit including a memory for storing a synaptic weight, where each neuron is connected to at least one other neuron via one of the plurality of the synaptic circuits.

Weights in a neural network are values that determine the importance of the input signals that a neuron receives. Weights are learnable parameters of the neural network. When a neuron receives an input signal, the input signal is multiplied by the weight associated with that input signal and provided to the neuron's processing element. The processing element sums all the weighted input signals that the neuron receives to determine the neuron's net input.

An activation function is applied to this net input to produce the neuron's output. The activation function introduces non-linearity into the network, allowing it to learn complex patterns and relationships within the data. Common activation functions include the sigmoid function, which maps the input to a value between 0 and 1, the hyperbolic tangent function, which maps the input to a value between −1 and 1, and the rectified linear unit (ReLU), which outputs the input directly if it is positive, otherwise it outputs zero.

The combination of weights and activation functions allows neural networks to approximate complex functions and make predictions or classifications based on input data. During training, the network adjusts the weights through a process called backpropagation, which involves calculating the gradient of the loss function with respect to each weight and updating the weights in the direction that minimizes the loss. This process is repeated iteratively until the network achieves a satisfactory level of accuracy. It is also possible to use a self-organizing neural network such as a Boltzman machine or an autoencoder.

In a hardware implementation of the described embodiments, one or more of the AI models can be executable on one or more processors, or microprocessors coupled to memory devices. The memory devices can store the executable instructions, related to the AI models. The stored executable instructions can program the processors or microprocessors to generate a plurality of neurons organized in an array in the memory devices. Each neuron can be implemented in the hardware to include or be connected to a register implemented in the processing elements, and to receive at least one neuron input. Each neuron can also be connected to a plurality of synaptic circuits, where each synaptic circuit, in turn includes additional neurons implemented in a synaptic memory for storing a synaptic weight, and an activation function. Each neuron is connected to at least one other neuron via one of the plurality of synaptic circuits. The execution of the AI models can include adjusting the synaptic weights, and executing the activation functions in a plurality of executions or runs of the AI models to generate an output. In some embodiments, time-domain signals can be combined (sensor fusion) in a reservoir architecture neural network, referred to as recurrent network in which the output layer is trained using, for example, a soft max or logistic function.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

EXAMPLES

It will be appreciated that the present disclosure may include any one and up to all of the following examples.

Example 1: A method comprising: providing a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a receiver, the receiver configured to transmit the samples to one or more servers in a maintenance infrastructure; a first monitor, collecting samples from a first component of a machine, generating a first monitor output sample waveform; a second monitor, collecting samples from a second component of the machine, generating a second monitor output sample waveform; providing the monitors with synchronization instructions; the first monitor, sending a synchronization beacon comprising sample identifier of a first monitor sample, the first monitor sample corresponding to a sample collected by the first monitor when sending the synchronization beacon; a second monitor, receiving the synchronization beacon; the second monitor, recording a second monitor sample corresponding to a sample collected by the second monitor when the second monitor received the synchronization beacon; generating an alignment reference point comprising a pair of samples, the pair comprising the first monitor sample and the second monitor sample; a server in the maintenance and monitoring infrastructure, receiving the alignment reference point; the server aligning the first and second monitors output sample waveforms to superimpose the pair of samples in the alignment reference point; and the server, identifying a failure type and/or a failure source from the aligned output sample waveform.

Example 2: The method of Example 1, further comprising: synchronizing the first and second monitors, using internal clocks of the monitors.

Example 3: The method of any of Examples 1 and 2, further comprising: the first monitor sending the synchronization beacons periodically, during a sample collection window.

Example 4: The method of any of Examples 1-3, further comprising: the receiver sending a receiver beacon, comprising begin sampling instruction; and the monitors placing the monitors in an wake state a selected time before the receiver sending the receiver beacon.

Example 5: The method of any of Examples 1-4, wherein the synchronization instructions comprise: the monitors listening for a synchronization beacon for a selected time; and when not hearing a synchronization beacon, sending synchronization beacons periodically.

Example 6: The method of any of Examples 1-5, further comprising: training a machine learning model, comprising: providing instructions to the machine learning model, the instructions comprising example aligned output sample waveforms and a corresponding failure type; inference operations comprising: providing the trained machine learning model with the aligned first and second monitors output sample forms; and the trained machine learning model outputting a failure type corresponding to the first and second monitors output sample waveforms.

Example 7: The method of any of Examples 1-6, wherein the synchronization beacon further comprises a monitor identifier, identifying the first monitor as sender of the synchronization beacon and an identifier of the synchronization beacon.

Example 8: A non-transitory computer storage in communication with a maintenance infrastructure, the maintenance infrastructure comprising a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a receiver, the receiver configured to transmit the samples to one or more servers in the maintenance infrastructure, wherein the non-transitory computer storage is configured to store executable program instructions that, when executed by one or more computing devices, configure the one or more computing devices to perform operations comprising: a first monitor, collecting samples from a first component of a machine, generating a first monitor output sample waveform; a second monitor, collecting samples from a second component of the machine, generating a second monitor output sample waveform; providing the monitors with synchronization instructions; the first monitor, sending a synchronization beacon comprising sample identifier of a first monitor sample, the first monitor sample corresponding to a sample collected by the first monitor when sending the synchronization beacon; a second monitor, receiving the synchronization beacon; the second monitor, recording a second monitor sample corresponding to a sample collected by the second monitor when the second monitor received the synchronization beacon; generating an alignment reference point comprising a pair of samples, the pair comprising the first monitor sample and the second monitor sample; a server in the maintenance and monitoring infrastructure, receiving the alignment reference point; the server aligning the first and second monitors output sample waveforms to superimpose the pair of samples in the alignment reference point; and the server, identifying a failure type and/or a failure source from the aligned output sample waveform.

Example 9: The non-transitory computer storage of Example 8, wherein the operations further comprise: synchronizing the first and second monitors, using internal clocks of the monitors.

Example 10: The non-transitory computer storage of any of Examples 8 and 9, wherein the operations further comprise: the first monitor sending the synchronization beacons periodically, during a sample collection window.

Example 11: The non-transitory computer storage of any of Examples 8-10, wherein the operations further comprise: the receiver sending a receiver beacon, comprising begin sampling instruction; and the monitors placing the monitors in an wake state a selected time before the receiver sending the receiver beacon.

Example 12: The non-transitory computer storage of any of Examples 8-11, wherein the synchronization instructions comprise: the monitors listening for a synchronization beacon for a selected time; and when not hearing a synchronization beacon, sending synchronization beacons periodically.

Example 13: The non-transitory computer storage of any of Examples 8-12, wherein the operations further comprise: training a machine learning model, comprising: providing instructions to the machine learning model, the instructions comprising example aligned output sample waveforms and a corresponding failure type; inference operations comprising: providing the trained machine learning model with the aligned first and second monitors output sample forms; and the trained machine learning model outputting a failure type corresponding to the first and second monitors output sample waveforms.

Example 14: The non-transitory computer storage of any of Examples 8-13, wherein the synchronization beacon further comprises a monitor identifier, identifying the first monitor as sender of the synchronization beacon and an identifier of the synchronization beacon.

Example 15: A system comprising one or more processors in communication with a maintenance infrastructure, the maintenance infrastructure comprising a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a receiver, the receiver configured to transmit the samples to one or more servers in the maintenance infrastructure, wherein the one or more processors are configured to perform operations comprising: a first monitor, collecting samples from a first component of a machine, generating a first monitor output sample waveform; a second monitor, collecting samples from a second component of the machine, generating a second monitor output sample waveform; providing the monitors with synchronization instructions; the first monitor, sending a synchronization beacon comprising sample identifier of a first monitor sample, the first monitor sample corresponding to a sample collected by the first monitor when sending the synchronization beacon; a second monitor, receiving the synchronization beacon; the second monitor, recording a second monitor sample corresponding to a sample collected by the second monitor when the second monitor received the synchronization beacon; generating an alignment reference point comprising a pair of samples, the pair comprising the first monitor sample and the second monitor sample; a server in the maintenance and monitoring infrastructure, receiving the alignment reference point; the server aligning the first and second monitors output sample waveforms to superimpose the pair of samples in the alignment reference point; and the server, identifying a failure type and/or a failure source from the aligned output sample waveform.

Example 16: The system of Example 15, wherein the operations further comprise: synchronizing the first and second monitors, using internal clocks of the monitors.

Example 17: The system of any of Examples 15 and 16, wherein the operations further comprise: the first monitor sending the synchronization beacons periodically, during a sample collection window.

Example 18: The system of any of Examples 15-17, wherein the operations further comprise: the receiver sending a receiver beacon, comprising begin sampling instruction; and the monitors placing the monitors in an wake state a selected time before the receiver sending the receiver beacon.

Example 19: The system of any of Examples 15-18, wherein the synchronization instructions comprise: the monitors listening for a synchronization beacon for a selected time; and when not hearing a synchronization beacon, sending synchronization beacons periodically.

Example 20: The system of any of Examples 15-19, wherein the operations further comprise: training a machine learning model, comprising: providing instructions to the machine learning model, the instructions comprising example aligned output sample waveforms and a corresponding failure type; inference operations comprising: providing the trained machine learning model with the aligned first and second monitors output sample forms; and the trained machine learning model outputting a failure type corresponding to the first and second monitors output sample waveforms.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:

providing a plurality of remote monitors, each monitor comprising: a wireless communication module, a microcontroller, an accelerometer, and a battery module, each monitor configured to collect machine samples from a machine or a subcomponent of the machine in a plant, the monitor in wireless communication with a receiver, the receiver configured to transmit the samples to one or more upstream servers in a maintenance infrastructure;

a first monitor, collecting samples from a first component of a machine, generating a first monitor output sample waveform;

a second monitor, collecting samples from a second component of the machine, generating a second monitor output sample waveform;

providing the monitors with synchronization instructions;

the first monitor, sending a synchronization beacon comprising sample identifier of a first monitor sample, the first monitor sample corresponding to a sample collected by the first monitor when sending the synchronization beacon;

a second monitor, receiving the synchronization beacon;

the second monitor, recording a second monitor sample corresponding to a sample collected by the second monitor when the second monitor received the synchronization beacon;

generating an alignment reference point comprising a pair of samples, the pair comprising the first monitor sample and the second monitor sample;

an upstream server in the maintenance and monitoring infrastructure, receiving the alignment reference point;

the upstream server aligning the first and second monitors output sample waveforms to superimpose the pair of samples in the alignment reference point;

the upstream server, identifying a failure type and/or a failure source from the aligned output sample waveform between the first component and the second component of the machine; and troubleshooting the failure source, based on the aligned first and second monitors output sample waveforms.

2. The method of claim 1, further comprising: synchronizing the first and second monitors, using internal clocks of the monitors.

3. The method of claim 1, further comprising: the first monitor sending the synchronization beacons periodically, during a sample collection window.

4. The method of claim 1, further comprising:

the receiver sending a receiver beacon, comprising begin sampling instruction; and the monitors placing the monitors in an wake state a selected time before the receiver sending the receiver beacon.

5. The method of claim 1, wherein the synchronization instructions comprise:

the monitors listening for a synchronization beacon for a selected time; and when not hearing a synchronization beacon, sending synchronization beacons periodically.

6. The method of claim 1, further comprising:

training a machine learning model, comprising: providing instructions to the machine learning model, the instructions comprising example aligned output sample waveforms and a corresponding failure type;

inference operations comprising:

providing the trained machine learning model with the aligned first and second monitors output sample forms; and the trained machine learning model outputting a failure type corresponding to the first and second monitors output sample waveforms.

7. The method of claim 1, wherein the synchronization beacon further comprises a monitor identifier, identifying the first monitor as sender of the synchronization beacon and an identifier of the synchronization beacon.

8. A non-transitory computer storage in communication with a maintenance infrastructure, the maintenance infrastructure comprising a plurality of remote monitors, each monitor comprising: a wireless communication module, a microcontroller, an accelerometer, and a battery module, each monitor configured to collect machine samples from a machine or a subcomponent of the machine in a plant, the monitor in wireless communication with a receiver, the receiver configured to transmit the samples to one or more upstream servers in the maintenance infrastructure, wherein the non-transitory computer storage is configured to store executable program instructions that, when executed by one or more computing devices, configure the one or more computing devices to perform operations comprising:

a first monitor, collecting samples from a first component of a machine, generating a first monitor output sample waveform;

a second monitor, collecting samples from a second component of the machine, generating a second monitor output sample waveform;

providing the monitors with synchronization instructions;

the first monitor, sending a synchronization beacon comprising sample identifier of a first monitor sample, the first monitor sample corresponding to a sample collected by the first monitor when sending the synchronization beacon;

a second monitor, receiving the synchronization beacon;

the second monitor, recording a second monitor sample corresponding to a sample collected by the second monitor when the second monitor received the synchronization beacon;

generating an alignment reference point comprising a pair of samples, the pair comprising the first monitor sample and the second monitor sample;

an upstream server in the maintenance and monitoring infrastructure, receiving the alignment reference point;

the upstream server aligning the first and second monitors output sample waveforms to superimpose the pair of samples in the alignment reference point;

the upstream server, identifying a failure type and/or a failure source from the aligned output sample waveform between the first component and the second component of the machine; and troubleshooting the failure source, based on the aligned first and second monitors output sample waveforms.

9. The non-transitory computer storage of claim 8, wherein the operations further comprise: synchronizing the first and second monitors, using internal clocks of the monitors.

10. The non-transitory computer storage of claim 8, wherein the operations further comprise: the first monitor sending the synchronization beacons periodically, during a sample collection window.

11. The non-transitory computer storage of claim 8, wherein the operations further comprise:

the receiver sending a receiver beacon, comprising begin sampling instruction; and the monitors placing the monitors in an wake state a selected time before the receiver sending the receiver beacon.

12. The non-transitory computer storage of claim 8, wherein the synchronization instructions comprise:

the monitors listening for a synchronization beacon for a selected time; and when not hearing a synchronization beacon, sending synchronization beacons periodically.

13. The non-transitory computer storage of claim 8, wherein the operations further comprise:

training a machine learning model, comprising: providing instructions to the machine learning model, the instructions comprising example aligned output sample waveforms and a corresponding failure type;

inference operations comprising:

providing the trained machine learning model with the aligned first and second monitors output sample forms; and the trained machine learning model outputting a failure type corresponding to the first and second monitors output sample waveforms.

14. The non-transitory computer storage of claim 8, wherein the synchronization beacon further comprises a monitor identifier, identifying the first monitor as sender of the synchronization beacon and an identifier of the synchronization beacon.

15. A system comprising one or more processors in communication with a maintenance infrastructure, the maintenance infrastructure comprising a plurality of remote monitors, each monitor comprising: a wireless communication module, a microcontroller, an accelerometer, and a battery module, each monitor configured to collect machine samples from a machine or a subcomponent of the machine in a plant, the monitor in wireless communication with a receiver, the receiver configured to transmit the samples to one or more upstream servers in the maintenance infrastructure, wherein the one or more processors are configured to perform operations comprising:

a first monitor, collecting samples from a first component of a machine, generating a first monitor output sample waveform;

a second monitor, collecting samples from a second component of the machine, generating a second monitor output sample waveform;

providing the monitors with synchronization instructions;

the first monitor, sending a synchronization beacon comprising sample identifier of a first monitor sample, the first monitor sample corresponding to a sample collected by the first monitor when sending the synchronization beacon;

a second monitor, receiving the synchronization beacon;

the second monitor, recording a second monitor sample corresponding to a sample collected by the second monitor when the second monitor received the synchronization beacon;

generating an alignment reference point comprising a pair of samples, the pair comprising the first monitor sample and the second monitor sample;

an upstream server in the maintenance and monitoring infrastructure, receiving the alignment reference point;

the upstream server aligning the first and second monitors output sample waveforms to superimpose the pair of samples in the alignment reference point;

the upstream server, identifying a failure type and/or a failure source from the aligned output sample waveform between the first component and the second component of the machine; and troubleshooting the failure source, based on the aligned first and second monitors output sample waveforms.

16. The system of claim 15, wherein the operations further comprise:

synchronizing the first and second monitors, using internal clocks of the monitors.

17. The system of claim 15, wherein the operations further comprise:

the first monitor sending the synchronization beacons periodically, during a sample collection window.

18. The system of claim 15, wherein the operations further comprise:

the receiver sending a receiver beacon, comprising begin sampling instruction; and the monitors placing the monitors in an wake state a selected time before the receiver sending the receiver beacon.

19. The system of claim 15, wherein the synchronization instructions comprise:

the monitors listening for a synchronization beacon for a selected time; and when not hearing a synchronization beacon, sending synchronization beacons periodically.

20. The system of claim 15, wherein the operations further comprise:

training a machine learning model, comprising: providing instructions to the machine learning model, the instructions comprising example aligned output sample waveforms and a corresponding failure type;

inference operations comprising:

providing the trained machine learning model with the aligned first and second monitors output sample forms; and the trained machine learning model outputting a failure type corresponding to the first and second monitors output sample waveforms.

* * * * *